United States Patent
Peters et al.

(10) Patent No.: US 7,747,114 B2
(45) Date of Patent: Jun. 29, 2010

(54) TILTED COMBINERS/DECOMBINERS AND PHOTONIC INTEGRATED CIRCUITS (PICS) EMPLOYING THE SAME

(75) Inventors: Frank H. Peters, Western Road (IR); Charles H. Joyner, Sunnyvale, CA (US); Mark J. Missey, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 12/240,065

(22) Filed: Sep. 29, 2008

(65) Prior Publication Data

US 2009/0021835 A1    Jan. 22, 2009

Related U.S. Application Data (60) Division of application No. 11/377,155, filed on Mar. 16, 2006, now Pat. No. 7,444,048, and a continuation-in-part of application No. 10/846,336, filed on May 13, 2004, now Pat. No. 7,209,611, and a continuation-in-part of application No. 10/267,331, filed on Oct. 8, 2002, now Pat. No. 7,283,694.

(60) Provisional application No. 60/663,279, filed on Mar. 18, 2005, provisional application No. 60/470,570, filed on May 14, 2003.

(51) Int. Cl.
G02B 6/34 (2006.01)
G02B 6/26 (2006.01)
G02B 6/43 (2006.01)

(52) U.S. Cl. ............................... 385/37; 385/14; 385/24; 385/47

(58) Field of Classification Search ....................... None
See application file for complete search history.

(56) References Cited

U.S. PATENT DOCUMENTS 4,835,782 A    5/1989    Kaede et al.

(Continued)

FOREIGN PATENT DOCUMENTS

EP    0390416 A3    10/1990

(Continued)

OTHER PUBLICATIONS

D. A. Ackerman, et al., "A Practical DBR Laser Based Wavelength Selectable DWDM Source", IEEE LEOS Newsletter, pp. 7-9, Oct. 2001.

(Continued)

*Primary Examiner*—Tina M Wong
(74) *Attorney, Agent, or Firm*—W. Douglas Carothers, Jr.; David L. Soltz (57) ABSTRACT

A monolithic optical transmitter photonic integrated circuit (TxPIC) comprises a plurality of integrated modulated sources which, when all operated at constant current, display a power output that varies as a function of array position similar to a quadratic-shaped curve and, further, forming an array of signal channels each having a different wavelength output. An optical combiner/decombiner is integrated in the circuit and has at least one free space region with a plurality of ordered bands along its edge where the zero order band is substantially at a longitudinal centerline of the free space region and where, on either side of this band, is a first order band followed by additional higher order bands. The ends of the output waveguides from the modulated sources are coupled approximate to the free space region edge along a region of the zero order band between one of the adjacent first order bands and a longitudinal centerline of the zero order band so that the inputs of the signal channels to the combiner of are titled or offset with respect to the longitudinal centerline of the combiner free space region so the combined outputs from the optical combiner will be aligned along the slope of the quadric-shaped curve of the combiner output passband envelope. The tilted combiner/decombiner may also be deployed in a receiver photonic integrated circuit (RxPIC) or other circuit employing such a device.

11 Claims, 8 Drawing Sheets

U.S. PATENT DOCUMENTS

| | | |
|---|---|---|
| 4,923,271 A | 5/1990 | Henry et al. |
| 4,954,786 A | 9/1990 | Yamakawa et al. |
| 5,078,516 A | 1/1992 | Kapon et al. |
| 5,115,444 A | 5/1992 | Kirkby et al. |
| 5,199,092 A | 3/1993 | Stegmueller |
| 5,206,920 A | 4/1993 | Cremer et al. |
| 5,288,659 A | 2/1994 | Koch et al. |
| 5,338,223 A | 8/1994 | Melatti et al. |
| 5,341,391 A | 8/1994 | Ishimura |
| 5,351,262 A | 9/1994 | Poguntke et al. |
| 5,394,489 A | 2/1995 | Koch |
| 5,396,507 A | 3/1995 | Kaminow et al. |
| 5,418,183 A | 5/1995 | Joyner et al. |
| 5,428,225 A | 6/1995 | Silva et al. |
| 5,450,431 A | 9/1995 | Glance et al. |
| 5,483,372 A | 1/1996 | Green |
| 5,488,507 A | 1/1996 | Nishimura |
| 5,530,580 A | 6/1996 | Thompson et al. |
| 5,536,085 A | 7/1996 | Li et al. |
| 5,550,666 A | 8/1996 | Zirngibl |
| 5,561,682 A | 10/1996 | Aoki et al. |
| 5,600,742 A | 2/1997 | Zirngibl |
| 5,612,968 A | 3/1997 | Zah |
| 5,617,234 A | 4/1997 | Koga et al. |
| 5,629,241 A | 5/1997 | Matloubian et al. |
| 5,631,768 A | 5/1997 | Bruno |
| 5,663,823 A | 9/1997 | Suzuki |
| 5,663,824 A | 9/1997 | Koch et al. |
| 5,673,141 A | 9/1997 | Gambini |
| 5,720,893 A | 2/1998 | Ben-Michael et al. |
| 5,745,270 A | 4/1998 | Koch |
| 5,745,613 A | 4/1998 | Fukuchi et al. |
| 5,745,616 A | 4/1998 | Zirngibl |
| 5,784,183 A | 7/1998 | Aoki et al. |
| 5,787,106 A | 7/1998 | Tabuchi et al. |
| 5,790,729 A | 8/1998 | Pologe et al. |
| 5,798,859 A | 8/1998 | Colbourne et al. |
| 5,805,755 A | 9/1998 | Amersfoort et al. |
| 5,825,792 A | 10/1998 | Villeneuve et al. |
| 5,870,512 A | 2/1999 | Koch et al. |
| 5,889,906 A | 3/1999 | Chen |
| 5,891,748 A | 4/1999 | Sakata |
| 5,894,362 A | 4/1999 | Onaka et al. |
| 5,913,000 A | 6/1999 | Doerr et al. |
| 5,917,625 A | 6/1999 | Ogusu et al. |
| 5,946,331 A | 8/1999 | Amersfoort et al. |
| 5,949,562 A | 9/1999 | Kubota et al. |
| 5,960,014 A | 9/1999 | Li et al. |
| 5,960,141 A | 9/1999 | Sasaki et al. |
| 5,963,686 A | 10/1999 | Zheng et al. |
| 5,987,050 A | 11/1999 | Doerr et al. |
| 6,005,995 A | 12/1999 | Chen et al. |
| 6,026,107 A | 2/2000 | Huang |
| 6,031,851 A | 2/2000 | Shimizu et al. |
| 6,055,078 A | 4/2000 | Chen et al. |
| 6,055,250 A | 4/2000 | Doerr et al. |
| 6,061,158 A | 5/2000 | DeLong |
| 6,101,210 A | 8/2000 | Bestwick et al. |
| 6,104,516 A | 8/2000 | Majima |
| 6,111,674 A | 8/2000 | Bhagavatula |
| 6,112,000 A | 8/2000 | Bergmann et al. |
| 6,118,562 A | 9/2000 | Lee et al. |
| 6,120,190 A | 9/2000 | Leard et al. |
| 6,141,152 A | 10/2000 | Trouchet |
| 6,141,477 A | 10/2000 | Kitamura |
| 6,154,474 A | 11/2000 | Yoshida |
| 6,162,655 A | 12/2000 | Johnson et al. |
| 6,172,782 B1 | 1/2001 | Kobayashi |
| 6,174,748 B1 | 1/2001 | Jeon et al. |
| 6,181,849 B1 | 1/2001 | Lin et al. |
| 6,186,631 B1 | 2/2001 | Behringer et al. |
| 6,188,499 B1 | 2/2001 | Majima |
| 6,192,170 B1 | 2/2001 | Komatsu |
| 6,201,599 B1 | 3/2001 | Ryu et al. |
| 6,204,109 B1 | 3/2001 | Shieh |
| 6,233,262 B1 | 5/2001 | Mesh et al. |
| 6,236,771 B1 | 5/2001 | Aoki et al. |
| 6,240,118 B1 | 5/2001 | Doerr et al. |
| 6,261,857 B1 | 7/2001 | Alam et al. |
| 6,271,947 B1 | 8/2001 | Iannone et al. |
| 6,275,317 B1 | 8/2001 | Doerr et al. |
| 6,278,170 B1 | 8/2001 | Komatsu |
| 6,291,813 B1 | 9/2001 | Ackerman et al. |
| 6,301,031 B2 | 10/2001 | Li |
| 6,304,350 B1 | 10/2001 | Doerr et al. |
| 6,304,692 B1 | 10/2001 | Sappey et al. |
| 6,310,719 B1 | 10/2001 | Goldstein et al. |
| 6,323,987 B1 | 11/2001 | Rinaudo et al. |
| 6,339,662 B1 | 1/2002 | Koteles et al. |
| 6,369,923 B1 | 4/2002 | Kuo et al. |
| 6,392,751 B1 | 5/2002 | Koch et al. |
| 6,411,424 B1 | 6/2002 | Raj |
| 6,424,439 B1 | 7/2002 | King |
| 6,434,303 B1 | 8/2002 | Temkin et al. |
| 6,466,707 B1 | 10/2002 | Dawes et al. |
| 6,490,044 B1 | 12/2002 | Koch et al. |
| 6,493,487 B1 | 12/2002 | Temkin et al. |
| 6,501,773 B1 | 12/2002 | Volz et al. |
| 6,501,866 B2 | 12/2002 | Thomas |
| 6,512,864 B1 | 1/2003 | Lin et al. |
| 6,542,268 B1 | 4/2003 | Rotolo et al. |
| 6,553,162 B1 | 4/2003 | Okayama |
| 6,553,165 B1 | 4/2003 | Temkin et al. |
| 6,590,693 B2 | 7/2003 | Ash et al. |
| 6,613,596 B2 | 9/2003 | Bloemer et al. |
| 6,661,974 B1 | 12/2003 | Akiyama et al. |
| 6,678,429 B2 | 1/2004 | Mossberg et al. |
| 6,700,517 B1 | 3/2004 | Kellar |
| 6,701,043 B2 | 3/2004 | Delisle et al. |
| 6,766,077 B2 | 7/2004 | Packirisamy et al. |
| 6,782,163 B2 | 8/2004 | Dragone |
| 6,785,306 B2 | 8/2004 | Kai et al. |
| 6,795,163 B2 | 9/2004 | Finders |
| 6,829,417 B2 | 12/2004 | Greiner et al. |
| 6,904,205 B2 | 6/2005 | Berolo |
| 6,959,129 B2 | 10/2005 | He et al. |
| 6,985,648 B2 | 1/2006 | Kish et al. |
| 7,043,109 B2 | 5/2006 | Kish et al. |
| 7,054,517 B2 | 5/2006 | Mossberg et al. |
| 7,058,246 B2 | 6/2006 | Joyner et al. |
| 7,062,111 B2 * | 6/2006 | Grubb et al. .................. 385/14 |
| 7,062,114 B2 | 6/2006 | Webjorn et al. |
| 7,072,557 B2 | 7/2006 | Nagarajan et al. |
| 7,079,715 B2 | 7/2006 | Kish et al. |
| 7,110,627 B2 | 9/2006 | Rahman |
| 7,116,851 B2 | 10/2006 | Welch et al. |
| 7,158,699 B2 | 1/2007 | Welch et al. |
| 7,209,611 B2 | 4/2007 | Joyner |
| 7,283,694 B2 | 10/2007 | Welch et al. |
| 7,295,783 B2 | 11/2007 | Singh et al. |
| 7,373,045 B2 | 5/2008 | Levner et al. |
| 7,444,048 B2 | 10/2008 | Peters et al. |
| 7,460,742 B2 | 12/2008 | Joyners et al. |
| 7,466,882 B2 | 12/2008 | Kish et al. |
| 7,483,599 B2 | 1/2009 | Dominic et al. |
| 2002/0126386 A1 | 9/2002 | Jordan et al. |
| 2002/0171890 A1 | 11/2002 | Lin et al. |
| 2002/0181856 A1 | 12/2002 | Sappey et al. |
| 2003/0011833 A1 | 1/2003 | Yankov et al. |
| 2003/0031412 A1 | 2/2003 | Payne et al. |
| 2003/0206681 A1 | 11/2003 | Polonskiy et al. |
| 2003/0206694 A1 | 11/2003 | Babin et al. |
| 2003/0210862 A1 | 11/2003 | Yankov et al. |
| 2004/0036933 A1 | 2/2004 | Yankov et al. |

| 2004/0067006 A1 | 4/2004 | Welch et al. |
| 2005/0094927 A1 | 5/2005 | Kish et al. |

FOREIGN PATENT DOCUMENTS

| EP | 0639876 | 2/1995 |
| EP | 0671792 A1 | 9/1995 |
| JP | 58092289 | 6/1983 |
| WO | WO 00/52789 | 9/2000 |
| WO | WO 01/16642 | 3/2001 |
| WO | WO 01/17076 | 3/2001 |
| WO | WO 01/18919 | 3/2001 |
| WO | WO 01/24328 | 4/2001 |
| WO | WO 01/63962 | 8/2001 |
| WO | WO 01/63963 | 8/2001 |

OTHER PUBLICATIONS

K. Affolter, "Integrating Active Components Improves System Design", WDM Solutions, pp. 6567, Jun. 2001.

D. Alfano, "System-on-Chip Technology Adds Options for Laser Driver Control", WDM Solutions, pp. 43-48, Nov. 2001.

Amersfoort et al., "Low-Loss Phased-Array Based 4-Channel Wavelength Demultiplexer Integrated with Photodetectors", IEEE Photonics Technology Letters, vol. 6(1), Jan. 1994.

M. Bouda, "Compact High-Power Wavelength Selectable lasers for WDM Applications", Conference on Optical Fiber Communication, Technical Digest series, vol. 1, pp. 178-180, Mar. 7-10, 2000.

T. Coroy, et al., "Active Wavelength Measurement System Using an InGaAs-InP Quantum-Well Electroabsorption Filtering Detector", IEEE Photonics Tecnology Letters, vol. 8, No. 12, pp. 1686-1688, Dec. 1996.

P. Doussiere, et al., "1.55µm Polarization Independent Semiconductor Optical Amplifier with 25 dB Fiber to Fiber Gain", IEEE Photonics Technology Letters, vol. 6(2), pp. 170-172, Feb. 1994.

Fallahi et al., "Grating Demultiplexer Integrated with MSM Detector Array in InGaAs/AlGaAs/GaAs for WDM", IEEE Photonics Technology Letters, vol. 5(7), pp. 794-797, Jul. 1993.

Fu et al., 1X8 Supergrating Wavelength-Division Demultiplexer in a Silica Planar Waveguide, Optics Letters, vol. 22(21), pp. 1627-1629, Nov. 1, 1997.

Glance, et al., "Applications of the Integrated Waveguide Grating Router", Journal of Lightwave Technology, vol. 12(6), pp. 957-962, Jun. 1994.

Green et al., "WDM Protocol-Transparent Distance Extension Using R2 Remodulation", IEEE Journal on Selected Areas in Communications, vol. 14(5), pp. 962-967, Jun. 1996.

Greiner at al., "Lithographically Fabricated Planar Holographic Bragg Reflectors", Journal of Lightwave Technology, vol. 22(1), pp. 136-145, Jan. 2004.

Greiner et al., "Low-Loss Silica-on-Silicon Two-Dimensional Fabry-Perot Cavity based on Holographic Bragg Reflectors", Optics Letters, vol. 30(1), pp. 38-40, Jan. 1, 2005.

Greiner et al., "Wavelength Division Multiplexing Based on Apodized Planar Holographic Bragg Reflectors", Applied Opitcs, vol. 43(23), pp. 4575-4583, Aug. 10, 2004.

Charles H. Henry, et al., "Four-Channel Wavelength Division Multiplexers and Bandpass Filters Based on Elliptical Bragg Reflectors", Journal of Lightwave Technology, vol. 8(5), pp. 748-755, May 1990.

Humphreys et al., "Fabrication Challenges for Enabling Metropolitan WDM Network Technologies", Compound Semiconductor, pp. 87-94, Jul. 2001.

K. Inoue et al., "Signal Improvement Effect in O/E-E/O Conversion Using an Electro-Absorption (EA) Modulator", IEEE Photonics Technology Letters, vol. 9(1), pp. 109-111, Jan. 1997.

K. Inoue, "Technique to Compensate Waveform Distortion in a Gain-Saturated Semiconductor Optical Amplifier Using a Semiconductor Saturable Absorber", Electronics Letters, vol. 34(4), pp. 376-378, Feb. 1998.

Janz et al., "Planar Waveguide Echelle Gratings in Silica-On-Silicon", IEEE Photonics Technology Letters, vol. 16(2), pp. 503-505, Feb. 2004.

D. Johnson et al., "Industrial Research Highlights: Agere Systems", IEEE LEOS Newsletter, pp. 3-7, Aug. 2001.

John E. Johnson et al., "Fully Stabilized Electroabsorption-Modulated Tunable DBR Laser Transmitter for Long-Haul Optical Communications", IEEE Journal on Selected Topics in Quantum Electronics, vol. 7(2), pp. 168-177, Mar./Apr. 2001.

C. H. Joyner at al., "An 8-Channel Digitally Tunable Transmitter with Electroabsorption Modulated Output by Selective-Area Epitaxy", IEEE Photonics Technology Letters, vol. 7(9), pp. 1013-1015, Sep. 1995.

C. H. Joyner et al., "Low-Threshold Nine-Channel Waveguide Grating Router-Based Continuous Wave Transmitter", Journal of Lightwave Technology, vol. 17(4), pp. 647-651, Apr. 1999.

Kameda et al., "A DBR Laser . . . Linewidth", IEEE Photonics Technology Letters, vol. 5(6), pp. 608-610, Jun. 1, 1993.

P.A. Kirkby, "Multichannel Wavelength-Switched Transmitters and Receivers - New Component Concepts for Broad-Band Networks and Distributed Switching Systems", Journal of Lightwave Technology, vol. 8(2), pp. 202-211, Feb. 1990.

Kitamura et al., "Polarization-Insensitive Semiconductor Optical Amplifier Array Grown by Selective MOVPE", IEEE Photonics Technology Letters, vol. 6(2), Feb., 1994.

Thomas L. Koch et al., "Semiconductor Lasers for Coherent Optical Fiber Communications", Journal of Lightwave Technology, vol. 8(3), pp. 274-293 Mar. 1990.

M. Kohtoku et al., "InP-Based 64-Channel Arrayed Waveguide Grating with 50 GHz Channel spacing and up to -20dB Crosstalk"1786-1787, Electronic Letters, vol. 33(21), pp. , Oct. 9, 1997.

Masaki Kohtoku, et al., "Polarization Independent Semiconductor Arrayed Waveguide Gratings Using a Deep-Ridge Waveguide Structure", IEICE Trans. Electron., vol. E81-C, No. 8, pp. 1195-1204, Aug. 1998.

Kudo et al., "1.55-µm Wavelength-Selectable Microarray DFB-LD's with Monolithically Integrated MMI Combiner, SOA, and EA-Modulator", IEEE Photonics Technology Letters, vol. 12(3), pp. 242-244, Mar. 2000.

Le et al., "Electrooptically Tunable Folded Arrayed Waveguide Grating Multiplexer", vol. 17(1), 112-114, Jan. 2005.

H. Lee, et al., "Multichannel Wavelength Locking Using Transmission Peaks of an AWG for Multichannel Optical Transmission Systems", IEEE Photonics Technology Letters, vol. 10, No. 2, pp. 276-278, Feb. 1998.

Beck Mason, et al., "40-Gb/s Tandem Electroabsorption Modulator", IEEE Photonics Technology Letters, vol. 14, No. 1, pp. 27-29, Jan. 2002.

S. Ménézo, et al., "10-Wavelength 200-GHz Channel Spacing Emitter Integrating DBR Lasers with a PHASAR on InP for WDM Applications", IEEE Photonics Technology Letters, vol. 11, No. 7, pp. 785-787, Jul. 1999.

Möller et al. "Mode Stabilization Technique for the Multifrequency Laser", 25th Optical Fiber Communication Conference, Technical Digest, pp. 187- 189, Mar. 7, 2000.

K. Nakamura, et al., Buried Heterostructure DFB Laser Integrated With Ridge Waveguide Electroabsorption Modulator With Over 20 GHz Bandwidth, European Conference on Optical Communications (ECOC '97), Conference Pub. No. 448, pp. 175-178, Sep. 22-25, 1997.

M.A. Newkirk, et al., "1.5 µm Multiquantum-Well Semiconductor Optical Amplifier with Tensile and Compressively Strained Wells for Polarization-Independent Gain", IEEE Photonics Technology Letters, vol. 4(4), pp. 406-408, Apr. 1993.

J. Park et al., "New design for Low-Loss Star Couplers and Arrayed Waveguide Grating devices", IEEE Photonics Technology Letters, vol. 14(5), pp. 651-653, May, 2002.

J. Park, et al., "A Multi-Wavelength Locker for WMD System", Conference on Optical Fiber Communication (OFC 2000), pp. WE 4-1 to WE 4-3, Wednesday, Mar. 8, 2000.

B. Pezeshki, et al., "12nm Tunable WDM Source Using an Integrated Laser Array", Electronics Letters, vol. 36, No. 9, pp. 788-789, Apr. 27, 2000.

Raybon et al., "Reconfigurable Optoelectronic Wavelength Translation Based on an Integrated Electroabsorption Modulated Laser Array", IEEE Photonics Technology Letters, vol. 10(2), pp. 215-217, Feb. 1998.

Sakano et al., "Tunable DFB Laser with a Striped Thin-Film Heater", IEEE Photonics Technology Letters, vol. 4(4), Apr. 1992.

R. A. Salvatore, et al., "Electroabsorption Modulated Laser for Long Transmission Spans", IEEE Journal of Quantum Electronics, vol. 38(5), pp. 464-476, May 2002.

J. Sarathy, et al., "Polarization Insensitive Waveguide Grating Routers in InP", IEEE Photonics Technology Letters, vol. 10(12), pp. 1763-1765, Dec. 1998.

Sasaki et al., "Selective MOVPE Growth and Its Application to Semiconductor Photonic Integrated Circuits", Electronics & Comunications in JP, vol. 76(4), pp. 1-11, Apr. 1, 1993.

M. Smit et al., Photonic Integrated Circuits for Advanced Communication Networks, International Journal of Optoelectronics, vol. 12(1), pp. 25-30, 1998.

Lucas B. Soldano, et al., "Optical Multi-Mode Interference Devices Based on Self-Imaging: Principles and Applications", Journal of Lightwave Technology, vol. 13(4), pp. 615-627, Apr. 1995.

J.B.D. Soole, et al., "Monolithic InP/InGaAsP/InP Grating Spectrometer for the 1.48 - 1.56 μm Wavelength Range", Applied Physics Letters, vol. 58(18), pp. 1949-1951, May 6, 1991.

J.B.D. Soole, et al., "Polarisation-Independent InP Arrayed Waveguide Filter Using Square Cross-Section Waveguides", Electronic Letters, vol. 32(4), pp. 323-324, Feb. 15, 1996.

Y. Suzaki et al., "Multi-Channel Modulation in a DWDM Monolithic Photonic Integrated Circuit", 14th Indium Phosphide and Related Materials Conference, Conference Proceedings, May 12-16, Stockholm, Sweden, Conference Proceedings, pp. 681-683.

H. Tanobe, et al., "Temperature Insensitive Arrayed Waveguide Gratings in InP Substrates", IEEE Photonics Technology Letters, vol. 10(2), pp. 235-237, Feb. 1998.

Vreeburg et al., "A Low-Loss 16-Channel Polarization Dispersion Compensated PHASAR Demultiplexer", IEEE Photonics Technology Letters, vol. 10(3), pp. 382-384, Mar. 1998.

D. Wolfson, et al., "Detailed Theoretical Investigation of the Input Power Dynamic Range for Gain-Clamped Semiconductor Optical Amplifier Gates at 10 Gb/s", IEEE Photonic Technology Letters, vol. 10(9), pp. 1241-1243, Sep. 1998.

V. Yankov et al., "Multiwavelength Bragg Gratings and Their Application to Optical MUX/DEMUX Devices", IEEE Photonics Technology Letters, vol. 15(3), pp. 410-412, Mar. 2003.

Y. Yokoyama et al., "Multi-Wavelength Locker Integrated Wide-Band Wavelength-Selectable Light Source Module", NEC Research & Development, Paper 13, pp. 158-161, Feb. 2002.

M. G. Young et al., "Six Wavelength Laser Array With Integrated Amplifier and Modulator", Electronic Letters, vol. 32(21), pp. 1835-1836, Oct. 12, 1995.

M. G. Young, "A 16 X 1 Wavelength Division Multiplexer with Integrated Distributed Bragg Reflector Lasers and Electroabsorption Modulators", IEEE Photonics Technology Letters, vol. 5, No. 8, pp. 908-910, Aug. 1993.

Chung-en Zah et al., "Multiwavelength DFB Laser Arrays With Integrated Combiner and Optical Amplifier for WDM Optical Networks", IEEE Journal of Selected Topics on Quantum Electronics, vol. 3(2), pp. 584-597, Apr. 1997.

Zirngibl et al., "High Performance, 12 Frequency Optical Multichannel Controller", Electronic Letters, vol. 30(9), pp. 700-701, Apr. 28, 1994.

M. Zirngibl, et al., "Polarisation Independent 8 x 8 Waveguide Grating Multiplexer on InP", Electronics Letters, vol. 29(2), pp. 201-202, Jan. 21, 1993.

JDS Uniphase Product Bulletin, "Fabry-Perot WavelockerTM", pp. 1-4, Nov. 2000.

"Silicon-Based Echelle Grating Technology for Metropolitan and Long-Haul DWDM Applications", pp. 1-11, (c) Optenia, Inc. 2001 (www.optenia.com).

Search report, Dec. 17, 2003, for PCT application PCT/US 02/32109.

* cited by examiner

TILTED COMBINERS/DECOMBINERS AND PHOTONIC INTEGRATED CIRCUITS (PICS) EMPLOYING THE SAME

CROSS REFERENCE TO RELATED APPLICATIONS

This application is a Divisional of application Ser. No. 11/377,155, filed Mar. 16, 2006, now U.S. Pat. No. 7,444,048 which claims priority of provisional application, Ser. No. 60/663,279, filed Mar. 18, 2005 and, further, is a continuation-in-part of patent application, Ser. No. 10/846,336, filed May 13, 2004 now U.S. Pat. No. 7,209,611 and entitled, TRANSMITTER AND RECEIVER PHOTONIC INTEGRATED CIRCUIT (TXPIC AND RXPIC) CHIPS UTILIZING COMPACT WAVELENGTH SELECTIVE COMBINERS/DECOMBINERS and published on Oct. 28, 2004 as Publication No. US 2004/0213582 A1, which claims priority to provisional application, Ser. No. 60/470,570, filed Apr. 14, 2003, which application is also incorporated herein by its reference, and is also a continuation-in-part of patent applications, Ser. No. 10/267,331, filed Oct. 8, 2002, now U.S. Pat. No. 7,283,694 also published on May 22, 2003 as Publication Ser. No. US 2003/0095737 A1, and entitled, TRANSMITTER PHOTONIC INTEGRATED CIRCUITS (TXPIC) AND OPTICAL TRANSPORT NETWORKS EMPLOYING TxPICs; Ser. No. 10/267,304, filed Oct. 8, 2002, also published on Feb. 19, 2004 as Publication Ser. No. US 2004/0033004 A1, and entitled, AN OPTICAL SIGNAL RECEIVER PHOTONIC INTEGRATED CIRCUIT (RxPIC), AN ASSOCIATED OPTICAL SIGNAL TRANSMITTER PHOTONIC INTEGRATED CIRCUIT (TXPIC) AND AN OPTICAL TRANSPORT NETWORK UTILIZING THESE CIRCUITS; Ser. No. 10/267,330, filed Oct. 8, 2002, also published on May 22, 2003 as Publication Ser. No. US 2003/0095736 A1, and entitled, TRANSMITTER PHOTONIC INTEGRATED CIRCUIT (TXPIC) CHIP ARCHITECTURES AND DRIVE SYSTEMS AND WAVELENGTH STABILIZATION FOR TxPICs; and Ser. No. 10/267,346, filed Oct. 8, 2002, also published on May 1, 2003 as Publication Ser. No. US 2003/0081878 A1 and entitled, TRANSMITTER PHOTON IC INTEGRATED CIRCUIT (TxPIC) CHIP WITH ENHANCED POWER AND YIELD WITHOUT ON-CHIP AMPLIFICATION, all of which applications are owned by the common assignee herein and are incorporated herein by their reference.

BACKGROUND OF THE INVENTION

1. Field of the Invention

This invention relates generally to combiners/decombiners, both of the selective wavelength type such as optical multiplexers/demultiplexers, for example, arrayed waveguide gratings (AWGs) or elliptical supergratings (ESGs) and of the non-selective wavelength type such as free space region couplers, star couplers or multi-mode interference (MMI) couplers. More particularly, this invention relates to the deployment of what we refer to as "tilted" optical combiners/decombiners of both the wavelength selective and the non-selective type.

2. General Definitions

Reference is made in this disclosure to a "optical combiner/decombiner" when only the application of the optical combiner itself is generally discussed. However, as it will be evident to those skilled in the art, the principals of such optical combiners shown in this disclosure can be equally be utilized as optical decombiners such as illustrated in an optical receiver photonic integrated circuit (RxPIC) disclosed in U.S. patent application Ser. No. 10/267,304, filed Oct. 8, 2002 and published on Feb. 19, 2004 as Pub. No. 2004/0033004, which application is incorporated herein by its reference.

Reference in this description to signal channels is nominally either a modulated semiconductor laser source or a semiconductor laser source and its associated modulator, each referred to as a "modulated source" and providing a modulated signal output. In this context, such a signal channel is also an optical waveguide with one or more accompanying integrated elements, such as, but not limited to, a laser source, a modulator, a photodetector or a semiconductor optical amplifier (SOA), a variable optical attenuator (VOA) or a combination VOA/SOA. Thus, a train of elements formed in each signal channel comprising a modulated source and other accompanying integrated elements for a signal channel array comprising two or more such channels integrated in a photonic integrated circuit (PIC).

"Laser emission wavelength" means emission output wavelength of a laser source in a particular signal channel formed in a photonic integrated circuit (PIC) such as an optical transmitter photonic integrated circuit or TxPIC.

"Active region wavelength" means the wavelength of the photoluminescence (PL) peak or the gain peak of an active region wavelength spectrum, for example, of laser source and/or modulator formed in a photonic integrated circuit (PIC) signal channel where the channel laser source and modulator share the same active region and active region bandgap and/or share the same active region and active region bandgap with adjacent, integrated signal channels. For purposes of brevity in this invention, PL peak and gain peak are used interchangeably although they are slightly different as is known in the art.

The terms, "laser(s)" and "laser source(s)", are used interchangeably in this disclosure.

An "active region" as employed in the description of this disclosure means the region in a semiconductor device where carrier recombination and/or light absorption occurs which may be comprised of a single semiconductor active layer or multiple semiconductor layers with any associated optical confinement layers, as is well known to those skilled in the art. An active layer, for example, may be a single high refractive index active layer or may be multiple active layers such as in the case of multiple quantum well layers and barrier layers which are, together, commonly referred to as an active region.

Also, examples of the inventive optical combiners/decombiners illustrated in this disclosure are referred to as "tilted" in the sense that the inputs or the outputs of the combiner free space region or regions are spaced from or offset relative to a longitudinal centerline of the free space region, but still remain within a zero order band of the combiner free space region, rather than being positioned on and about that centerline of a zero order band of an input free space region of the combiner, which is the common practice in such devices for optimized combiner passband results. In terms of the foregoing description, "offset" of the inputs or outputs, as the case may be, means that they are spatially to one side of the longitudinal centerline of the free space region, i.e., they are spatially offset.

3. Description of the Related Art

Figure 1:
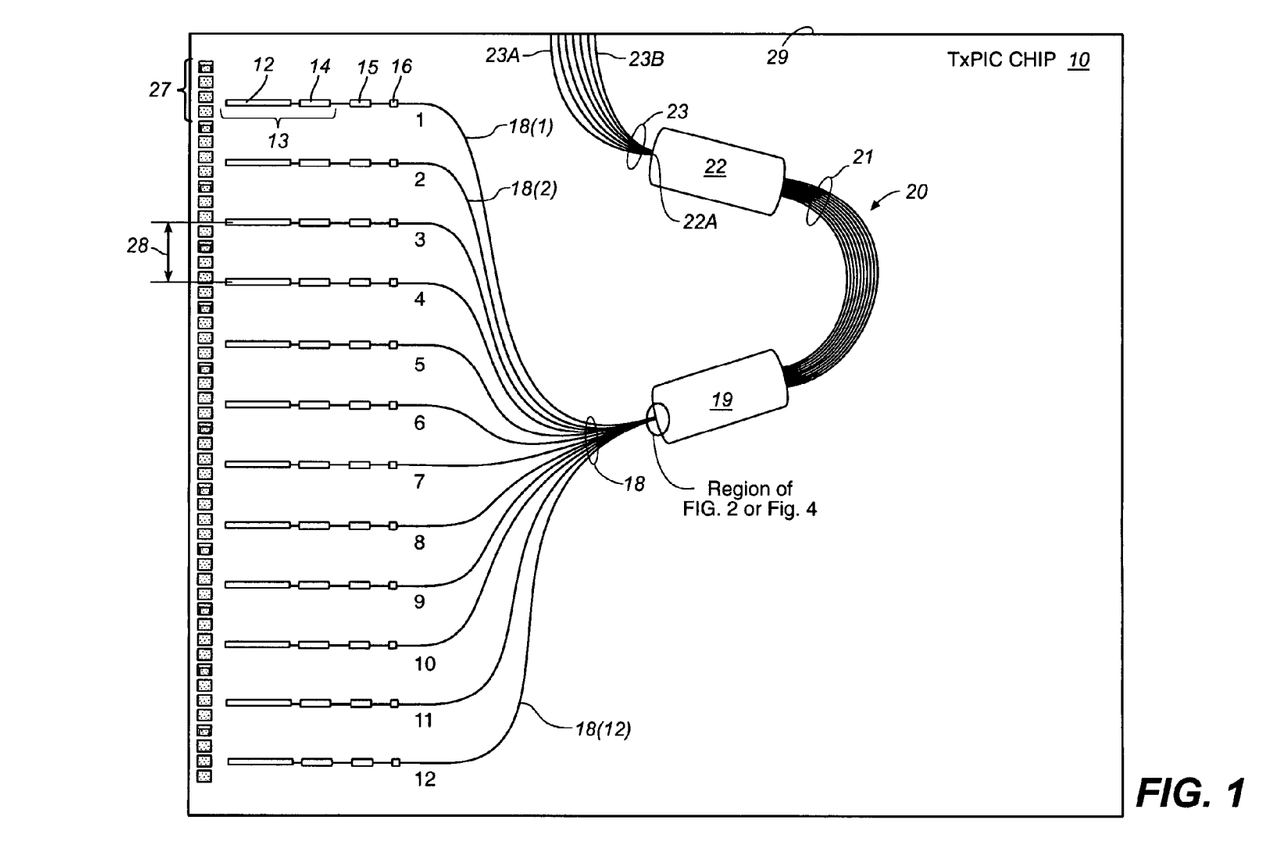
FIG. 1. is a plan view of a multi-signal channel, optical transmitter photonic integrated circuit (TxPIC) chip 10 having twelve (12) signal channels and which may be utilized in the practice of this invention, although the arrayed waveguide grating (AWG) of this invention may be employed in any other application requiring the multiplexing/demultiplexing of optical signals.

Reference is made to FIG. 1 which shows a transmitter photonic integrated circuit or TxPIC 10 which has been disclosed in U.S. patent application Ser. No. 10/267,331, filed Oct. 8, 2002, and published on May 22, 2003 as Pub. No. US 2003/0095737 A1, as well as disclosed in U.S. patent application Ser. No. 11/268,325, filed Nov. 7, 2005, both of which applications are owned by a common assignee herein and are incorporated herein by their reference. As shown in FIG. 1, monolithic PIC chip 10 comprises groups of integrated and optically coupled active and passive components formed in a series of signal channels, identified as channel Nos. 1 through 12 in FIG. 1. It should be noted that any number, N, of channels can be formed in chip 10, such as less than twelve channels or greater than twelve channels. Each signal channel includes a modulated source 13 comprising a laser diode 12, such as a DFB semiconductor laser or a DBR semiconductor laser, and an electro-optic modulator 14. Each laser source 12 operates at a different wavelength, $\lambda_1$-$\lambda_N$ where N here is equal to twelve, where the group of wavelengths provides a wavelength grid that may be commensurate with a standardized wavelength grid, such as the ITU wavelength grid, but may also operate on a non-standard or form a wavelength grid with nonuniform wavelength spacing. On the other hand, the wavelength grid need not be any particular standard. Laser diodes 12 are respectively provided with an associated electro-optic modulator 14 as shown in the example here. Thus, the CW outputs of laser diode sources 12 are shown optically coupled to respective modulators 14. Modulators 14 may be electro-absorption modulators (EAMs) or Mach-Zehnder modulators (MZMs) as detailed in patent application Ser. No. 10/267,331, supra. It is within the scope of this disclosure that rather deploying electro-optic modulators 14, laser diode sources 12, themselves, may be directly modulated. Modulators 14 each apply an electrical modulated signal to the CW light from laser diodes 12 producing an optical modulated signal for transmission on an optical link of an optical transmission network. The modulated source outputs from modulators 14 may be optically coupled to a photodetector 16 for the purposes of monitoring the output power or signal characteristics received from modulators 14. The on-chip deployment of photodetectors 16 is optional. Photodetectors 16 may also be fabricated off-axis of a channel or in-tandem with the optical train elements 12, 14 and 15. Photodetectors 16 may be PIN photodiodes, MSM photodetectors, or avalanche photodiodes (APDs). Also, each signal channel may include an electro-optical amplitude varying element (AVE) 15. An AVE channel element 15 may be a variable optical attenuator (VOA), a semiconductor optical amplifier (SOA), a gain-clamped SOA (GC-SOA), or a combination VOA/SOA, the latter of which is also referred to in the second of the above identified and incorporated patent applications as a "ZOA". A ZOA is capable of biasing either positive or negative to adjust the optical power level in a channel to be higher or lower, respectively. The train of these elements 12, 14, 15 and 16 are numerically identified for only signal channel No. 1 in FIG. 1 so that it should be understood in this description that they are all the same for the remaining signal channel Nos. 2 through 12.

An approach in the operation of TxPIC 10 is to operate all semiconductor lasers 12 at a predetermined power level throughout the life of the PIC chip 10. In this way, the need for control logic to vary laser current to control power level changes over life is eliminated, which current changes can also change the effective emission wavelength of the laser which must be maintained on a desired wavelength grid in optical transmission systems. Over the life of the semiconductor lasers 12, the power levels will fall naturally due to certain deleterious aging effects so that the on-chip AVE channel elements 15 are deployed to maintain the predetermined power level such as by boosting the power of the modulated signal. The semiconductor laser deleterious aging effects are the development of leakage current paths in the laser and dopants in the laser semiconductor layers will migrate over time reducing its slope efficiency as well as, to some extent, misalignment of the TxPIC chip output to its package output fiber due to constant temperature variations imposed upon the chip package over time.

As indicated above and as explained in more detail in patent application Ser. No. 10/267,331, supra, modulators 14 may be fabricated as electro-absorption modulators (EAMs), Mach-Zehnder modulators (MZMs) or band edge Mach-Zehnder modulators. The modulated optical signal outputs of modulators 14, via photodetectors 16, are respectively coupled, via waveguides 18(1) . . . 18(12), to an on-chip or integrated wavelength selective combiner, shown here as an arrayed waveguide grating or AWG 20. Waveguides 18(1) . . . 18(12) receive the modulated channel signals from the N channels and provide them as an input to AWG 20. Combiner or multiplexer 20 may also be substituted by another type of wavelength-selective combiner/decombiner, such as an elliptical supergrating, an Echelle grating, a cascaded Mach-Zehnder interferometers (CMZIs), broadband multiplexers of the type shown, for example, in U.S. Pat. No. 6,580,844 (which is also incorporated herein by its reference), a so-called free-space diffraction grating (FSDG) or a quasi-selective wavelength star coupler having a multimode coupling region comprised of waveguides as disclosed in U.S. patent application, publication No. 2003/0012510 (which is also incorporated herein by its reference). Such wavelength-selective combiners or multiplexers are more conducive to high channel signal count on a TxPIC chip 10. However, it is within the scope of this disclosure to practice the invention in connection with non-wavelength selective couplers, such as power couplers, star couplers or MMI couplers which can be employed in particular circumstances. Each of the modulated sources 13 is, therefore, representative of an optical signal channel Nos. 1 through 12 on TxPIC chip 10. There may be, for example, as many as forty (40) signal channels or more formed on a single TxPIC 10.

Each signal channel is typically assigned a minimum channel bandwidth spacing to avoid crosstalk with adjacent optical channels. Currently, for example, 50 GHz, 100 GHz, 200 GHz, or 400 GHz are common channel spacings between signal channels. The physical channel spacing or center-to-center spacing 28 of the signal channels may be 100 μm to 1,000 μm or more to minimize electrical or thermal cross-talk at data rates, for example, of 10 Gbit per second or greater, and facilitate routing of interconnections between bondpad groups 27 for the multiple PIC optical elements 12, 14, 15 and 16. Although not shown for the sake of simplicity, bonding pads may be provided in the interior of PIC chip 10 to accommodate wire bonding to particular on-chip interior electro-optic elements in addition to bond pad groups 27 comprising chip edge-formed bonding pads.

As indicated previously, the respective modulated outputs from electro-optic modulators 16 are coupled into optical waveguides 18(1) to 18(12) to the input of AWG 20 as shown in FIG. 1. AWG 20 comprises an input free space region 19 coupled to a plurality of diffraction grating waveguides 21 which are coupled to an output free space region 22. The multiplexed optical signal output from AWG 20 is shown as provided with a plurality of output waveguides 23 which comprise output venires, or what might be referred to as a plurality of spare outputs that provide optimum performance of the multiplexer to the same set of multiplexer inputs, which outputs are along the zero order Brillouin zone at output face 22A of output free space region 22 of AWG 20. However, the deployment of spare outputs 23 is optional and the output may be to a single output waveguide. Spare output waveguides 23 extend to output facet 29 of TxPIC chip 10 where a selected output may be optically coupled to an output fiber (not shown). The outputs may also be disposed at a small angle relative to a line normal to the plane of output facet 29 to prevent internal reflections from facet 29 back into vernier outputs 23 that may affect stabilized laser wavelength operation. The deployment of multiple vernier or spare outputs 23 provides a means by which the best or optimum output from AWG 20 can be selected having the best overall passband response of AWG 20 with the established wavelength grid of the group of channel signal outputs from the array of laser sources 12. Seven outputs 23 are shown in FIG. 1. It should be realized that any number of such vernier outputs may be utilized beginning with the provision of two of such outputs. Also, the number of such outputs may be an odd or even number.

In operation, AWG 20 receives N optical signals, $\lambda_1$-$\lambda_N$, from coupled input waveguides 18 which propagate through input free space region 19 where the wavelengths are distributed into the diffraction grating waveguides 21. The diffraction grating waveguides 21 are a plurality of grating arms of different lengths, $\Delta L$, relative to adjacent waveguides, so that a predetermined phase difference is established in waveguides 21 according to the wavelengths $\lambda_1$-$\lambda_N$. Due to the predetermined phase difference among the wavelengths in grating arms 21, the focusing position of each of the signals in grating arms 21 in output free space region 22 are substantially the same so that the respective signal wavelengths, $\lambda_1$-$\lambda_N$, are focused predominately at the center portion or the zero order Brillouin zone of output face 22A. Verniers 23 receive various passband representations of the multiplexed signal output from AWG 20. Higher order Brillouin zones along output face 22A receive repeated passband representations of the multiplexed signal output at lower intensities. The focus of the grating arm outputs to the zero order Brillouin zone may not be uniform along face 22A due to inaccuracies inherent in fabrication techniques employed in the manufacture of TxPIC chip 10. However, with multiple output verniers 23, an output vernier can be selected having the best or optimum combined WDM signal output in terms of power and responsivity.

Power output across an array of lasers, when forward biased at identical currents may vary as a function of position across the array for a number of reasons. One possibility is systematic variation from the design specifications to fabrication tolerance. Another is the predictable variation one gets from the application of selective area growth in a fabrication step, for example. Regardless of the cause of the output power variation across the array, power equalization at the chip output is very desirable so that a desired signal to noise ratio (SNR) will be achieved at an optical receiver in an optical transmission network. One approach to the signal output power equalization is to adjust the bias current of each of the lasers to follow the power spectrum curve such that more bias current is provided to the weaker lasers and less bias current is provided to the stronger lasers. However, this not a successful approach because the weaker lasers often have higher current thresholds compared to the stronger lasers. As a result, the weaker lasers will have less power output. To increase the bias current on the weaker lasers to provide improved power equalization across the signal channel outputs means that some lasers will be operating at higher current levels relative to the respective laser current thresholds (ITH) than other lasers so that the overall life expectancy of the TxPIC may be shorter than what is actually possible.

Another approach is to operate all of the lasers at their highest rated power level and then employ in each signal channel an amplitude varying element (AVE), particularly a loss element such as a variable optical attenuator (VOA), to reduce the highest rating power level across the laser array output to a substantially equalized level. As the laser sources age over time, their power intensity reduces so that the negative bias applied to the VOAs, relative to each element, can be correspondingly reduced to maintain the same and original power output level across the laser array over the life of the TxPIC. This approach includes, alternatively, the utilization of ZOAs (or in addition to the VOAs, SOAs) in each signal channel where the power in some of the channels reduced while the power in some of the other channels is increased to achieve power equalization across the signal channels. The downside to this approach is the throwing away of laser power in addition to providing a channel array of biased elements in the circuit that increase both the power budget and thermal budget of the TxPIC chip.

Figure 2:
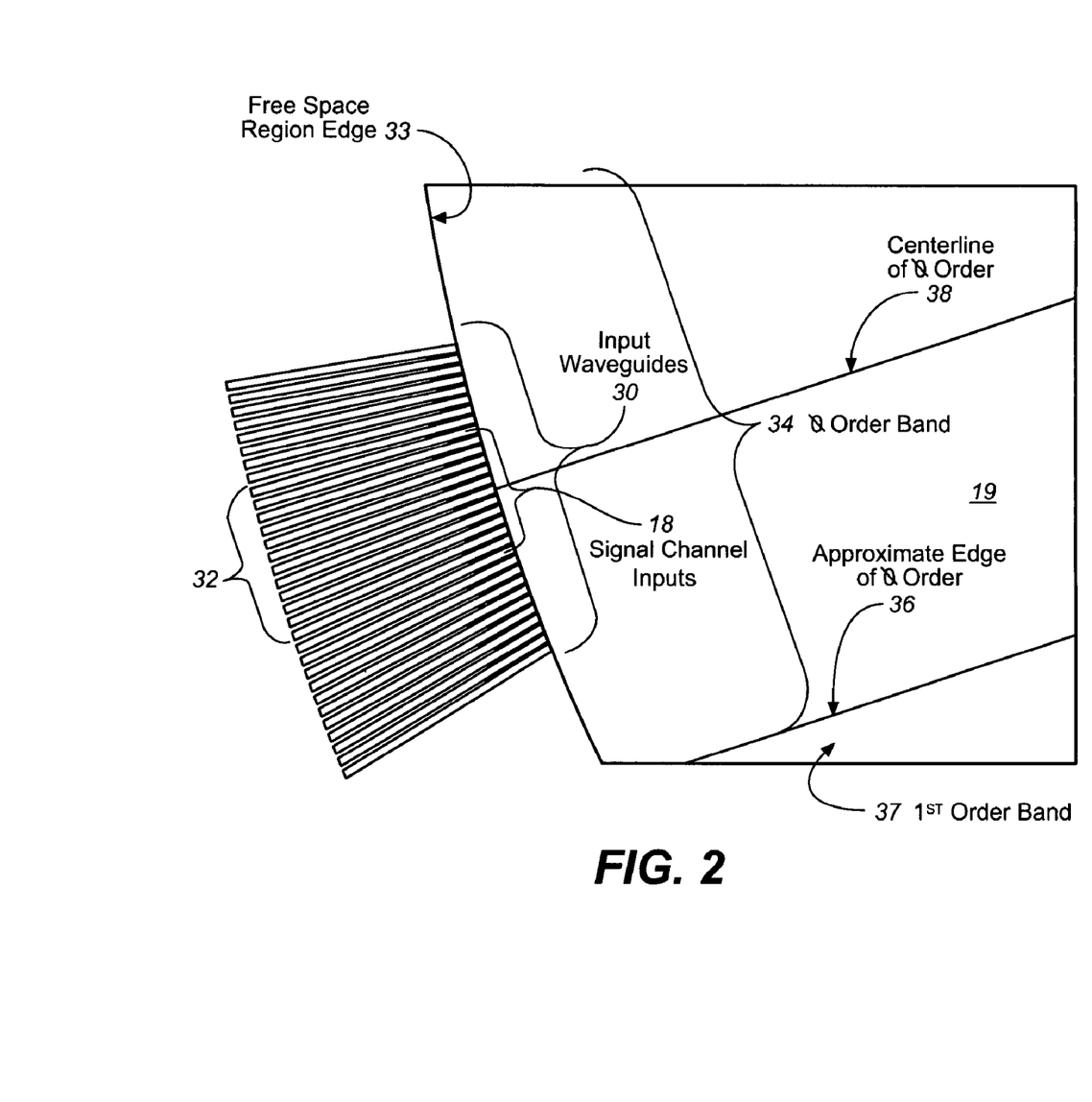
FIG. 2 is a detailed plan view of the input free space region 19 of the arrayed waveguide grating (AWG) 20 of FIG. 1 illustrating thirty-one (31) waveguide inputs, twelve (12) of which are the utilized signal channels 18 for input to the combiner free space region 19.
Figure 3:
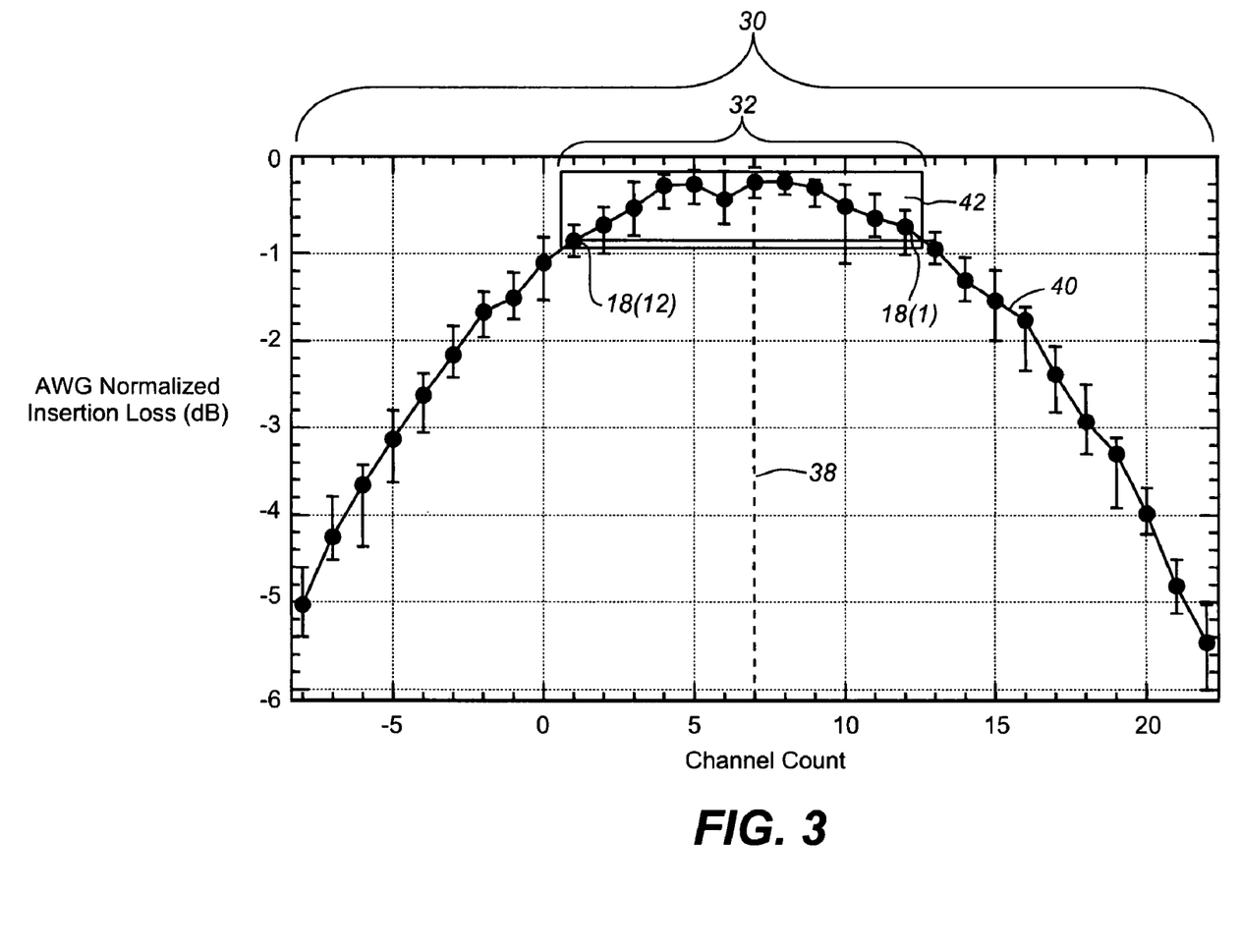
FIG. 3 is a graphic illustration of the passband envelope comprising AWG normalized insertion loss versus channel count from an output vernier of arrayed waveguide grating (AWG) 20 across thirty-one (31) input waveguides where twelve (12) signal channels for TxPIC 10 are centered about the peak of the passband envelope 40 of AWG 20 which is the center of the zero order of the AWG input space region 19.

In ordinary combiners/decombiners known in the art, particularly of the wavelength selective type, the output waveguides are coupled to the center of the zero order band about the centerline of the free space region. In this case, all of the inputs and/or outputs to and from the free space region would be substantially parallel with the free space region longitudinal centerline. In this connection, reference is made to FIG. 2 which illustrates how the waveguide inputs of the twelve (12) signal channels are provided to the input free space region 19 of arrayed waveguide grating (AWG) 20 along the free space input edge 33. The inputs, which shown here number thirty-one (31) are formed into the zero order band 34 providing input channels 30 for the purposes of this description which will become clearer later on. Within the input signal channels 30 are the twelve input signal channels 32 from modulated sources 13 shown in FIG. 1, where the channel inputs 18 are centered about the centerline 38 of the zero order band 34 of free space region 19. Also, shown in FIG. 2 is one approximate edge 36 of zero order band 34. It is standard practice to center the waveguide inputs 32 at the center of the zero order band 34 of input free space region 19 of AWG 20. This is because the optimum power in the passband of AWG 20 is generally centered on the centerline 38 of the center or zero order band 34 of input space region 19 as illustrated in FIG. 3. FIG. 3 is a graphic illustration of the power output passband envelope of AWG comprising passband curve or envelope 40. Each dot on curve 40 represents an input channel 30 along the passband envelope or curve 40. The twelve centered channel inputs 18 in TxPIC 10, designated by rectangle 42 in FIG. 3, are the twelve channels approximate to or abounding either side of the peak of normal power distribution through free space region 19 of AWG 20, i.e., the region in curve 40 where its passband envelope is optimum and the most uniform in terms of flatness as compared to other regions of the same curve 40.

We have discovered a new approach that at least reduces, if not eliminates in certain cases, the necessity of an increase in power and thermal budget brought about by the inclusion of at least one AVE in each signal channel. This new approach involves the passband spectrum of the optical combiner integrated in the TxPIC or any other photonic integrated circuit for that matter, such as, for example, the design of arrayed waveguide grating (AWG) 20 and other such wavelength selective combiners/decombiners mentioned later in this disclosure and, more particularly, the particular placement of the input waveguides or channels 18(1) . . . 18(N) relative to the zero order band 34 of input free space region 19 of AWG 20.

SUMMARY OF THE INVENTION

According to this invention, a monolithic optical transmitter photonic integrated circuit (TxPIC) comprises a plurality of integrated modulated sources having an array of laser sources with power outputs, at constant current, varying across the array similar to a quadratic-shaped curve and, further, forming an array of signal channels each having a different wavelength output which are a series of regularly spaced wavelengths. An optical combiner/decombiner is integrated in the circuit and has at least one free space region to receive a plurality of waveguides each respectively carrying a signal wavelength output from a modulated source. The optical combiner/decombiner may be of the non-reflective or transmissive type or of the reflective type. The free space region has a plurality of ordered bands along its edge where the zero order band is substantially at a longitudinal centerline of the free space region where, on either side of this band, is a first order band followed by additional higher order bands. The ends of the output waveguides from the modulated sources may be coupled approximate to the free space region edge along a region of the zero order band between one of the adjacent first order bands and a longitudinal centerline of the zero order band so that the inputs of the signal channels to the combiner of are titled or offset with respect to the longitudinal centerline of the combiner free space region so the combined outputs from the optical combiner will be aligned along the slope of the quadric-shaped curve of the combiner output passband envelope. This combiner passband quadric-shaped curve is substantially matched to the quadric-shaped curve of the predetermined active region wavelength spectrum of the modulated sources in such a way that enhanced power uniformity is achieved in a natural way across the modulated source array outputs as produced in the combiner output.

We refer to these waveguide input ends as provide to the combiner free space region as "tilted" because, by placing input ends into the free space region offset from the free space longitudinal centerline, a small angle is imposed by the offset input and that angle is tilted with respect to the free space region zero order band centerline. The same tilt will be projected at the output venires or spares of either the same (in the case of a reflective-type) or different (in the case of non-reflective or transmissive type) free space region of the combiner. The provision of a plurality of output spares along and offset within the zero order Brillouin zone of the combiner free space region, from whence the combined modulated source signal output is directed, provides for selection of one such output that is optimum relative to having the highest power performance.

In the case of the present invention, as will be discussed later on, the input waveguides or channels are offset from a free space region longitudinal centerline of a combiner/decombiner within the zero order band or input of the free space region. The channel offset can be offset to be in close proximity to an adjacent first order band of the free space coupler region but still remain in the free space coupler region zero order band, or can be offset from but approximate to the free space centerline in the free space zero order band, or in any intermediate space between the aforementioned extremity positions of the waveguide inputs in the free space coupler region zero order band.

It will be recognized that since the inputs of this invention are so tilted, all of the inputs can be utilized as inputs and all of the outputs can be utilized as outputs when deploying a reflective-type combiner/decombiner. This is not true with respect to standard reflective selective wavelength combiners/decombiners where their inputs are centered with respect to the free space region of the combiner. In other words, if one of the inputs to a conventional reflective-type selective wavelength combiner is employed as an output, it no longer can be deployed as an optical input to the combiner. On the other hand in a tilted reflective-type selective wavelength combiner of this invention, all the inputs, being offset from the centerline, can be deployed as inputs, and an output or outputs from the same free space region can be deployed at the opposite side of the free space region centerline.

Thus, the following advantages are realized from the deployment of a tilted combiner/decombiner of this invention. First, in this offset approach, a more compact reflective-type combiner/decombiner can be employed where the free space region functions as an output of the combiner as well as an input of the combiner. The output is offset from the centerline within the zero order band and may be in close proximity to a second adjacent first order band, on the opposite side of the free space region centerline from the free space input regions. Second, in the deployment of a titled input combiner of either the reflective-type or non-reflective-type integrated with an array of modulated sources in a monolithic photonic integrated circuit (PIC) where semiconductor lasers are employed as such sources and for any reason have a near quadratically varying output power versus channel number at a constant current the tilted input to the optical combiner/decombiner provides for a more evenly distributed power level across the modulated signal outputs from the integrated array of modulated sources. By tilting the inputs to the optical combiner, the natural passband filtering effect of the optical combiner can be deployed to provide more power to the weaker power laser sources and less power to the stronger power laser sources, thereby providing a natural contribution toward power equalization across the laser source outputs present at the output of the photonic integrated circuit (PIC). With the adaptation of this pre-distorted output power spectrum from the combiner integrated in a PIC, a lower PIC power, and thermal budget is achieved because of less required dependence, or no dependence in some circumstances, for on-chip optical AVE channel elements. The required bias current levels to such AVEs are reduced and, correspondingly, the thermal budget of the PIC chip is reduced. Also, since the power budget is decreased via less AVE bias current, the application of this invention provides for a TxPIC that may have more channels and/or operate at higher baud rates.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DETAILED DESCRIPTION OF THE INVENTION

Figure 4:
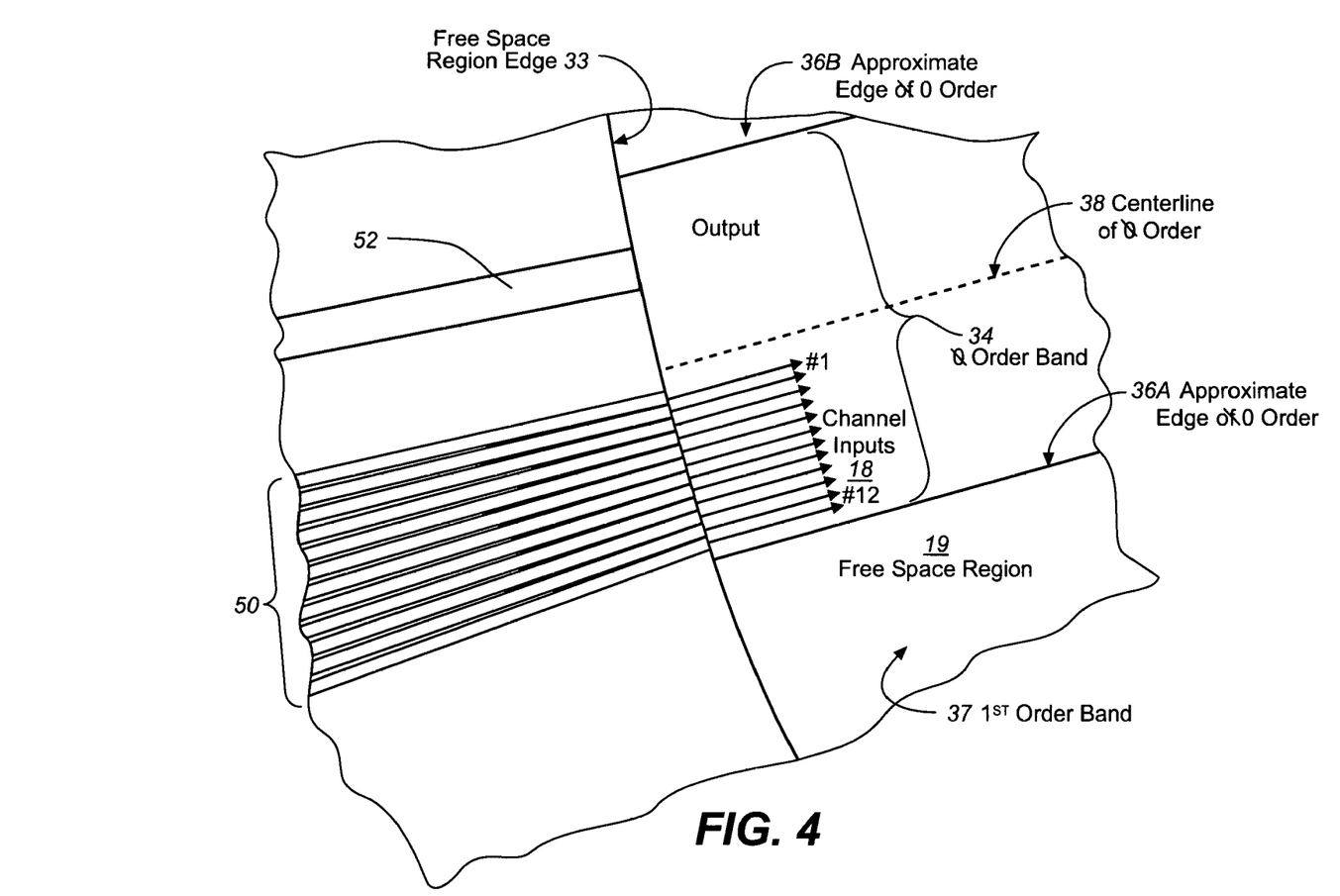
FIG. 4 is a detailed plan view of a first embodiment of this invention where the twelve (12) input channels are offset from centerline 38 of the zero order band 34 of input space region 19 and also, includes, in part, a portion of a third embodiment of this invention.

Reference is now made to FIG. 4 which is a first embodiment of this invention comprising twelve channel inputs 18 from modulated sources 13 in FIG. 1 except that these twelve input channels 50 are spatially offset from centerline 38 of zero order band 34 of input free space region 19. In a preferred embodiment, input channels 50 are offset in a region between centerline 38 and either edge 36A or 36B of zero order band 34 with a first order band 37. As previously indicated, we refer to this offset as "tilted", meaning that the waveguide inputs 18 of signal waveguide channels 50 are slightly angular with respect to the free space region centerline 38 since they are spatially offset to this centerline as well as substantially perpendicular with curved free space region edge 33. It should be noted that there is no definitive edge 36A between the zero and first order bands 34, 37 along free space region edge 33 of free space region 19. Rather, there is a decoupled spacing region or gap between the ordered bands, zero, first, second, etc., along free space region input edge 33. However, for purpose of illustration of the invention, the spatial offset of waveguides 50 is shown to be adjacent to an approximate edge 36A of zero order band 34, which edge is actually a separation region or gap between zero order band 34 and first order band 37. It is preferable that input channels not be in the next or first order band 37 because the power in this band 37 is 6 dB down from the power within zero order band 34. The output 52 shown in FIG. 4 is relative to another or third embodiment which will be discussed later.

Figure 5:
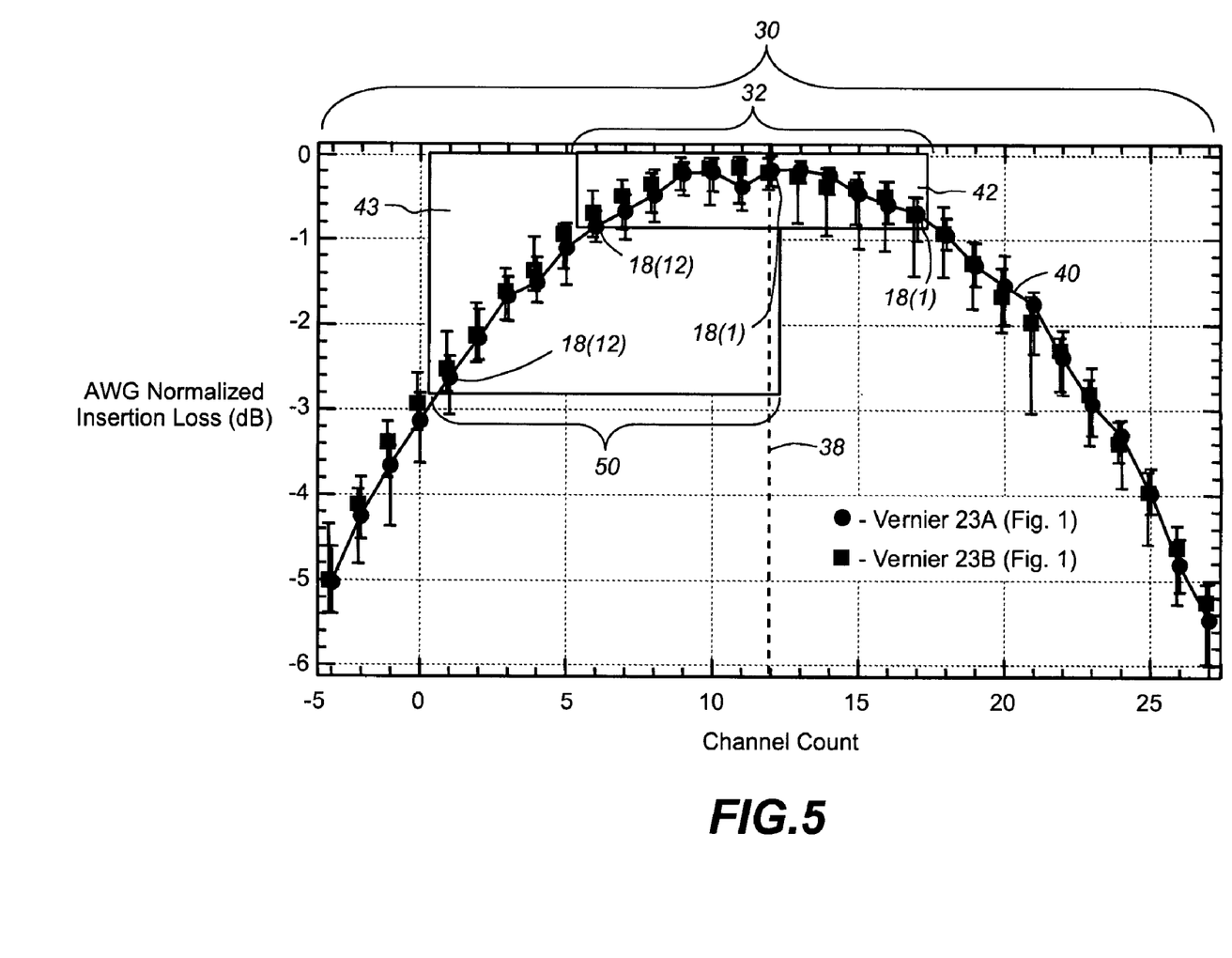
FIG. 5 is a graphic illustration of the first embodiment comprising passband envelope comprising AWG normalized insertion loss versus channel count from two separate output venires 23A and 23B of arrayed waveguide grating (AWG) 20 across thirty-one (31) input waveguides or signal channels where twelve (12) signal channels 50 for TxPIC 10 are tilted with respect to the peak of the passband envelope 40 of AWG 20.

The spatial offset or tilting of channel Nos. 1-12 in FIG. 4 is further illustrated in FIG. 5 which shows two sets of points representing thirty-one (31) channels approximating passband envelope or curve 40 which sets of points are representative of the power output passband envelope of AWG 20 with respect to two different output verniers, such as output verniers 23A and 23B as seen in FIG. 1. As can be seen from FIG. 5, the power output of AWG 20 across the wavelength spectrum of the thirty-one (31) input waveguides from output verniers 23A and 23B is substantially the same. Also, as seen in FIG. 5, the offset waveguide or signal channel inputs 50 of FIG. 4 are on the left side of the passband envelope as viewed from an output vernier 23 of AWG 20. In this case, it should be realized that modulated sources 13 include, at least, a laser diode 12, as previously indicated, where all of the laser sources 12 for the twelve separate signal channel Nos. 1-12 vary in output power in a near quadratic relationship to the channel number. The emission wavelengths of the lasers 12 are set by the DFB grating or the DBR gratings of the laser source, as the case may be.

What we have discovered is that since the weaker channels have the least amount power across the array of channels 50, it would be more preferable to place these lower power channels, such as channel Nos. 1, 2, 3, etc., closer to the peak of the power output passband envelope 40 of AWG 20 while the higher power channels, such as channel Nos. 12, 11, 10, etc., are positioned to be further down from the passband peak of the output passband envelope of AWG 20, as illustrated in FIG. 5 for these twelve channels 50 within rectangle 43. The quadratic-shaped envelope 40 can be engineered to match a number of arrayed output power slopes by employing known grating equations for designing an AWG that include the parameters involving the grating order, effective index of the free space region, group index of the AWG grating arms, channel spacing, path length of grating arms, equivalent center wavelength, and pitch of input and output free space regions and their focal length.

It is realized that a downside to this repositioning of the channel signal inputs 18 along the outer extremity of the zero order band 34, as illustrated in FIG. 4, with the highest power channel No. 12 positioned to receive the highest amount of offset power loss means that the signal channels 50 are receiving more passband loss in AWG 20 than would be experienced in the case where they are centered about centerline 38. However, this increase in insertion loss is significantly offset by the provision of more uniformly equalized signal channel power across channels 50 which leads to lower power and thermal budget requirements for TxPIC chip 10 and possibly the elimination of the need for any on-chip AVEs 15 in the respective signal channels 50. Thus, as a result of this tilted deployment of the channel inputs 18 into input free space region 19, the power provided at the output of combiner 20 is more uniform than in the case where the signal channels are distributed about the passband peak of output passband envelope 40 where, for example, the resulting output power from the weaker channel 18(1) or $\lambda_1$, is significantly lower than the resulting output power from the stronger channel 18(12) or $\lambda_{12}$ It should be realized that in this state or condition, the bias current applied to all laser sources 12 is maintained substantially the same as previously indicated to achieve simplicity in laser control throughout the life of PIC 10. Therefore, this offset of the channels 50 from the centerline 38 within the AWG zero order band 34 of combiner 20 provides for a naturally provided, more uniform power distribution across the channel array as seen at the combiner output before any subsequent power amplitude adjustment is considered necessary, such as, for example, with the deployment of AVEs or such power leveling elements, whether off-chip or on-chip. Further, as is well known, the power generated from semiconductor lasers over many years slowly degrades. As a result, the PIC design must include some way of providing the necessary original power level, designed for the circuit specifications, to provide at least two or 2 dB power to meet the needs at end of life. We call this additional power capacity the "end of life penalty". However, the dBs of power gained through the deployment of the tilted combiner/decombiner of this disclosure can be banked upon for use against the end of life penalty. In this manner, less power demand is accomplished at the start of life of the circuit and the extra circuit current budget achieved can be deployed at end of life without compromising the life of the on-chip, integrated semiconductor lasers. Lastly, but also very important, PIC die yields are dramatically increased with the deployment of this invention.

To be noted also in FIG. 5 is combiner output positions for thirty-one (31) channels from two different output verniers 23A and 23B from the zero order zone of input free space region 22. It can readily be seen that these channel positions relative to AWG normalized insertion loss are fairly well superimpose each other. Thus, no matter what output vernier 23 is selected from TxPIC 10, even when they are separated by a large nanometer amount, such as verniers 23A and 23B, which separation may be for example, but not limited to, as much as 1200 GHz apart, the effects of more uniformly distributed power across the channel array will be achieved with the utilization of this invention.

Figure 6:
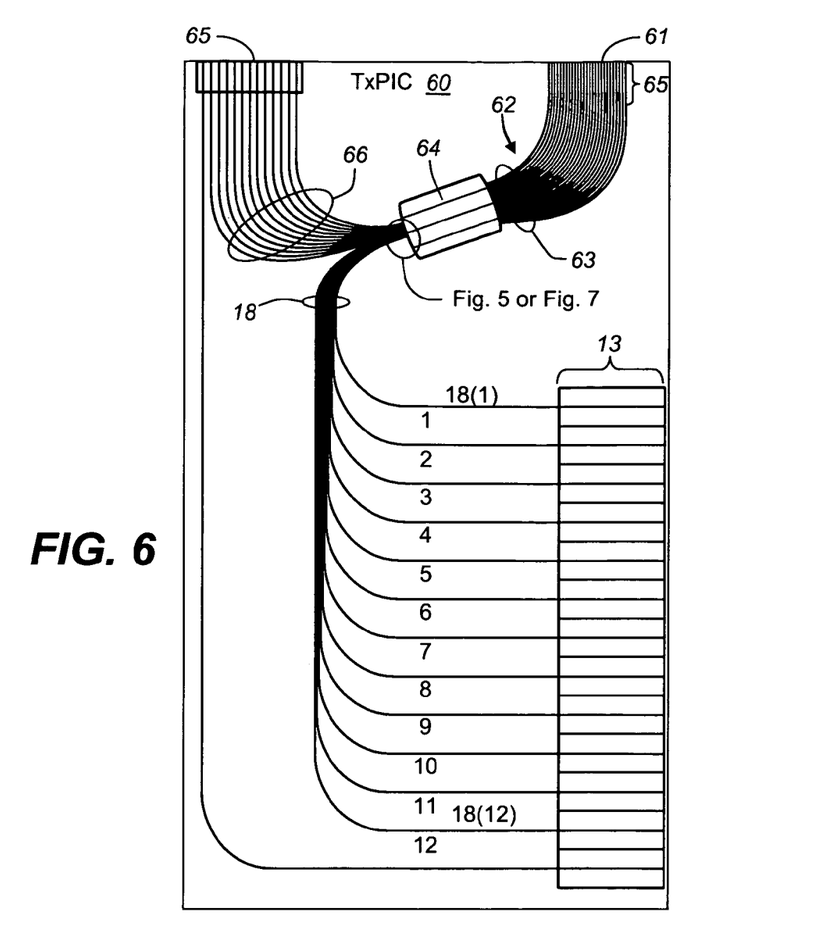
FIG. 6 is a plan view of a second embodiment of this invention.
Figure 7:
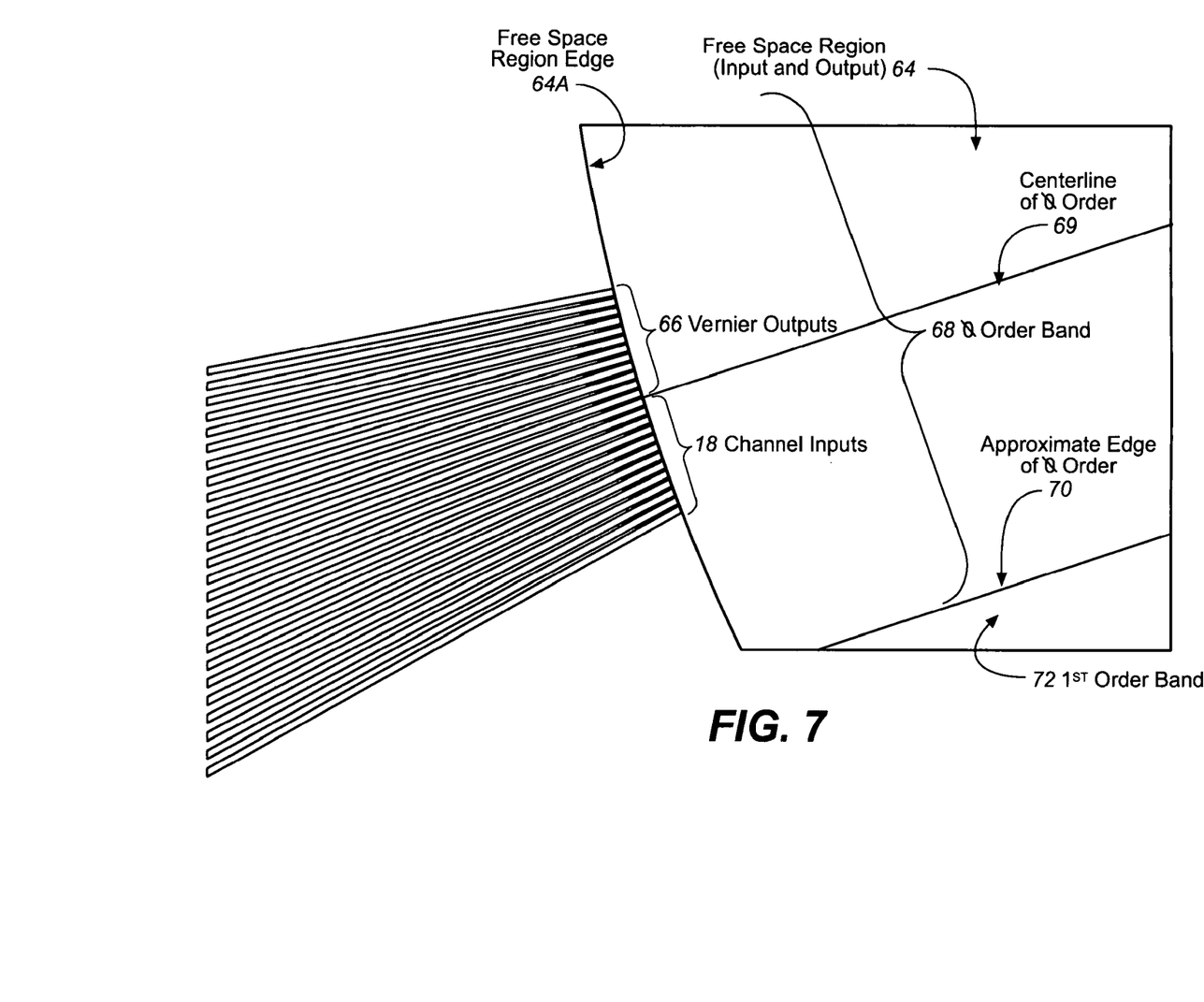
FIG. 7 is a detailed plan view of the second embodiment of this invention where twelve (12) input channels are offset from a first or one side of centerline 69 of the zero order band 68 of input/output free space region 19 and twelve (12) output channels are offset from a second or opposite side of centerline 69 of zero order band 68 of input/output free space region 19.

Reference is now made to a second embodiment of this invention shown in FIGS. 6 and 7. TxPIC 60 in FIG. 6 comprises a plurality of integrated modulated sources 13 for providing channel signals on output waveguides 18 comprising channels Nos. 1-12. Each channel waveguide 18(1) ... 18(12) is provided to an input/output free space region 64 of a reflective combiner 62 comprising, here, a reflective-type AWG. A reflective-type AWG is illustrated in the art as seen in U.S. Pat. No. 5,396,507 at device 7, which patent is incorporated herein by its reference. Reflective AWG 62 is optically the same as AWG 20 in FIG. 1 but physically different in construction in that the arrayed waveguide grating arms 63 approximate one-half the grating arms 21 of AWG 20 so that a single free space region 64 functions both as the input free space region 19 as well as output free space region 22 of AWG 20 of FIG. 1. A unique feature of reflective AWG 62 is that a portion 65 of grating arms 63 are substantially straight in length to facet reflector 61 so that, with appropriate equipment, a clean and highly accurate cleave can be made producing chip facet 61 that forms a cleaved face that is very near perfectly perpendicular to the ends of straight arm portions 65. This cleave can be made nearly perfect using stepper equipment, such as a wafer stepper or a step-and-scan apparatus as known in the art and manufactured by SML Netherlands B.V. See, for example, U.S. Pat. No. 6,795,163. In this manner, the cleave relative to straight arm portions 65 will be off from absolute perpendicular of no more that about 0.05°. For example, 0.1° off from absolute perpendicular (90°) would be too much rendering the reflective AWG 62 to have too much phase distortion between adjacent grating arms for practical utility. In the future, a mask aligner may also be used for this purpose.

Figure 8:
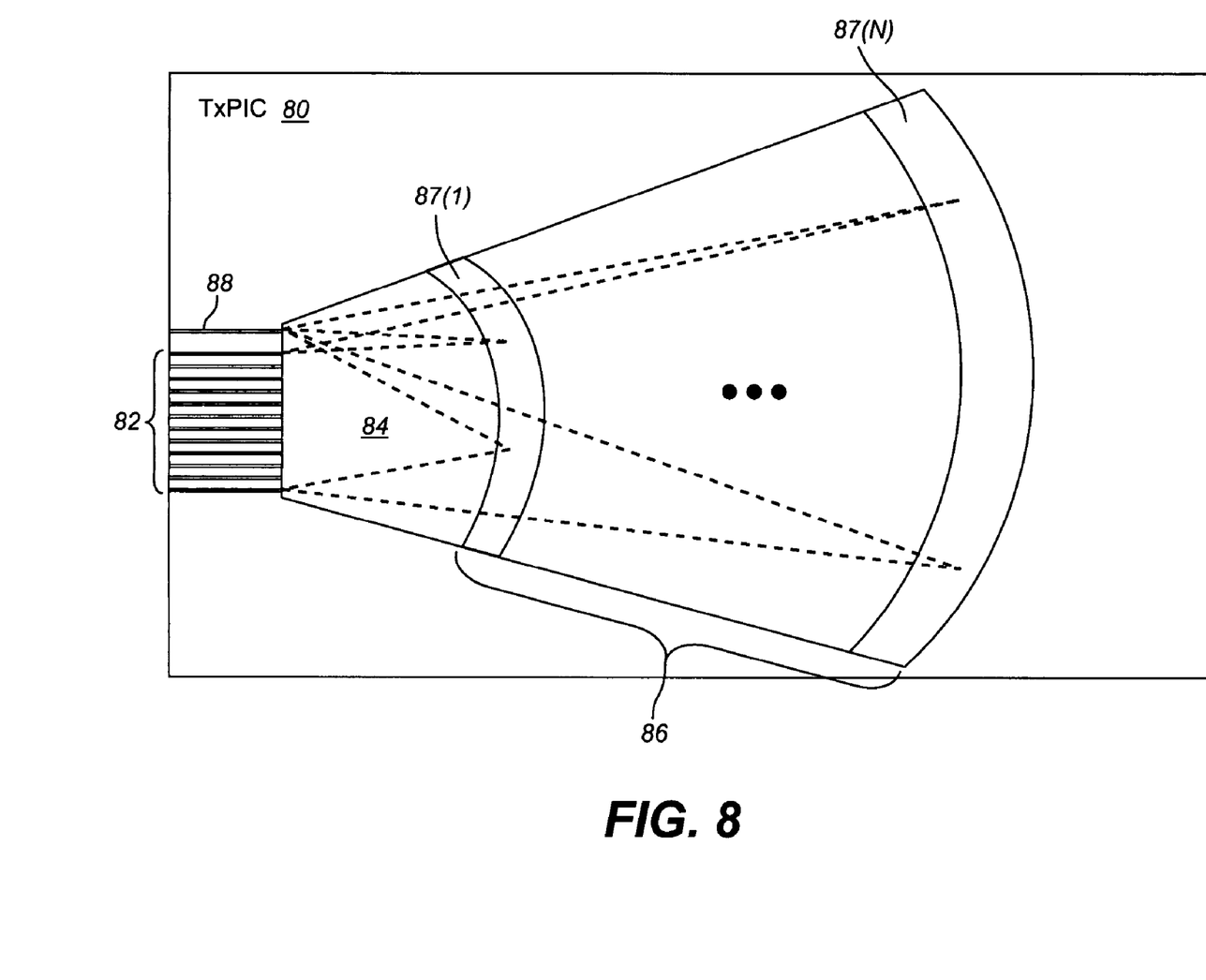
FIG. 8 is fourth embodiment of this invention that includes a combiner/decombiner comprising an elliptical supergrating.

As shown in FIG. 6, input/output free space region 64 is provided with twelve output venires 66 to an output edge 65 of facet 61. In this connection, reference is now made to FIG. 8 which shows a detail of the input/output region of free space region 64 along its edge 64A. As seen in FIG. 8, the twelve input channels comprising waveguides 18 are tilted from the centerline 69 of the zero order band 68. Here, however, they are not offset over to the approximate edge 70 of zero order band 68 with first order band 72. Rather, they are offset adjacent to centerline 69. Also, as shown in FIG. 6, there are twelve output verniers 66 comprising output waveguides to output facet 65.

A third embodiment of this invention is illustrated in connection with both FIGS. 5 and 7 where the FIG. 4 embodiment is viewed to include the input/output free space region 64 of reflective combiner 62 shown in FIG. 6. In this embodiment, there is one output 52 (FIG. 4) from reflective AWG combiner 62 where the combined channel signals on inputs 18 from modulated sources 13 are combined via reflective AWG 62 and the multiplexed, single output from reflective AWG 62 is provided at output 52 to output facet 65 of TxPIC 60.

With respect to multiplexers/demultiplexers, this invention has particular application to any such multiplexer/demultiplexer that has a passband envelope that falls off with insertion loss with respect to an envelope or passband peak of the multiplexer/demultiplexer. Examples of such devices are analog superimposed gratings, elliptical supergratings or planar holographic Bragg reflectors (HBRs), sampled gratings, super-structure gratings, chirped Bragg gratings, Dammann gratings, arrayed waveguide gratings (AWGs), binary superimposed gratings, notch filters, apodized Bragg reflectors, optical waveguide Bragg grating filters, Echelle gratings, cascaded Mach-Zehnder interferometers (CMZIs), broadband multiplexers, free-space diffraction gratings, and quasi-selective wavelength star couplers. A detailed description relating to some of these different gratings is set forth in patent publication No. US 2003/0007733 A1, published Jan. 9, 2003 and incorporated herein by its reference. An elliptical supergrating is also such a device and is illustrated in FIG. 8 as a fourth embodiment of this invention. Such supergratings are set forth in U.S. patent application publication No. US 2003/0210862 A1, published on Nov. 1, 2003, U.S. Pat. No. 6,829,417 B2, U.S. Pat. No. 6,678,429 B2, Greiner et al., "Low-Loss Silica-On-Silicon Two-Dimensional Fabry Perot Cavity Based on Holographic Bragg Reflectors", Optics Letters, Vol. 30(1), pp. 38-40, Jan. 1, 2005, patent application publication No. US 2005/0018951 A1, published on Jan. 27, 2005 as well as in U.S. application Ser. No. 10/846,336, filed May 13, 2004, supra, now U.S. patent application publication No. US 2004/0213582 A1, published on Oct. 28, 2004, all of which publications and patents are incorporated herein by their reference. In operational principal, this embodiment is the same as the third embodiment except that the combiner/decombiner 86 of FIG. 8 is employed as a wavelength selective combiner comprising elliptical supergrating reflectors or planar holographic Bragg reflectors (HBRs). These reflectors are computer generated, two-dimensional etched groups of gratings that are grating spaced a predetermined distance to reflect one or more different wavelengths of signal light. In this regard, in the embodiment shown, there are supergrating or HBR groups 87(1) to 87(N). Each group 87(N) may be comprised of diffracting segments spaced along scribed virtual contours as set forth in U.S. Pat. No. 6,829,417 across the width of the input field. The scribed diffractions segments significantly reduce insertion loss by reducing the fraction of the input optical field distribution that may propagate from one group 78(N) to another further group 78(N) because of no interaction with scribed diffraction segments in the former group. Also, each group can spatially image one or more input signals from modulated sources 82 to an output port 88 of TxPIC 80 or to some other integrated point or element input in TxPIC 80 such as, for example, to an integrated AVE in circuit 80 (not shown here; however, see, for example, such an AVE in FIG. 8 of Publication No. US 20030095737 A1, incorporated herein).

Figure 9:
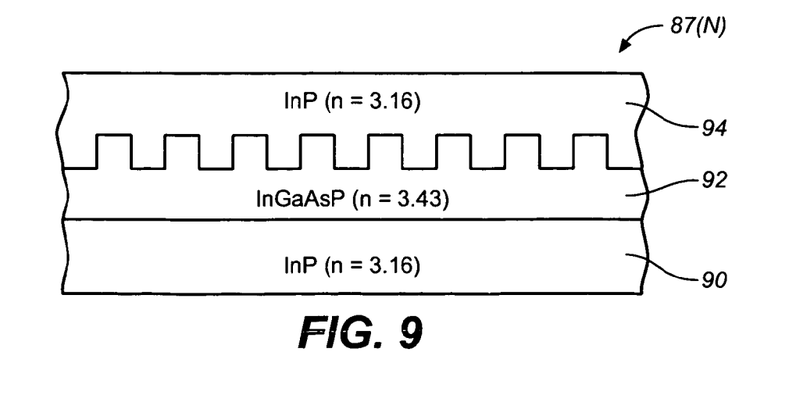
FIG. 9 is a longitudinal section along the path of light or radiation propagation of a portion of the gratings of an elliptical supergrating or HBR multiplexer/demultiplexer of FIG. 8.

While the references, incorporated above, deal primarily with silica-based core and cladding layers in the construction of combiner 86 of FIG. 8, such a structure can be integrated in an In-based TxPIC 80 as seen in FIG. 9. FIG. 9 is a longitudinal cross-section of a supergrating or HBR group 78(N) illustrating the waveguide structure of combiner 86. The waveguide structure comprises a core layer 92 of InGaAsP or AlInGaAs sandwiched between InP cladding layers 90 and 94. The structure is made using lithographic processes where after growth of core layer 92, the segments along virtual contours are etched in the appropriate pattern and proper segment period spacing, A, for interacting with the light wavelengths from modulated sources 82. The core layer is also the active layer for the modulated sources 82, all together forming a monolithic transmitter photonic integrated circuit (TxPIC) chip. The active layer, as known in the art, may be one or more layers, including multiplex quantum wells (MQWs) and barriers with associated confinement layers.

Thus, supergratings or HBRs 86, integrated in TxPIC 80, are adapted to receive the modulated channel signals from each of the modulated sources 82 and combine them into a single multiplexed multi-wavelength signal from TxPIC 80 via a common output waveguide 88. An elliptical supergrating which may be grayscale-patterned with formation of diffraction segments forming groups or sets of elliptical contour diffracted limited gratings or segmented gratings that will deflect selected emission wavelengths as modulated channel signals to common output 88. In this regard, these gratings are similar in functionality to arrayed waveguide gratings from the viewpoint of multiplexing different wavelength signals. As indicated previously, more detail concerning elliptical supergratings can be found in U.S. application Ser. No. 10/846,336, filed May 13, 2004, and published on Oct. 28, 2004 as Pub. No. US 2004/0213582 A1, supra.

It should be understood that the tilted combiner/decombiner disclosed herein can also be employed in other applications for such devices including, but not limited to, an optical receiver photonic integrated circuit (RxPIC), as disclosed in U.S. patent application Ser. No. 10/267,304, filed Oct. 8, 2002 and published on Feb. 19, 2004 as Pub. No. US 2004/0033004 A1, supra.

While the invention has been described in conjunction with several specific embodiments, it is evident to those skilled in the art that many further combiner/decombiner alternatives, modifications, and variations will be apparent in light of the foregoing description. Thus, the invention described herein is intended to embrace all such alternatives, modifications, applications and variations as may fall within the spirit and scope of the appended claims.

The invention claimed is:

1. A method, comprising the steps of:
providing a plurality of optical sources on a substrate, such that a first one of the plurality of optical sources is configured to generate a first optical signal having a first wavelength, and a second one of the plurality of optical sources is configured to generate a second optical signal having a second wavelength different than the first wavelength, the first one of the plurality of optical sources supplying the first optical signal with a first power and the second one of the plurality of optical sources supplying the second optical signal with a second power level greater than the first power level; and
providing an optical combiner on the substrate, the optical combiner having first and second inputs configured to receive the first and second optical signals, respectively, the optical combiner having an associated passband envelope that has a transmission that varies substantially quadratically as a function of wavelength, wherein the optical combiner has a first loss at the first wavelength and a second loss at the second wavelength, the first loss being less than the second loss.

2. A method in accordance with claim 1, wherein each of the plurality of optical sources is configured to receive a common current, the first and second ones of the plurality of optical sources respectively generating the first and second optical signals in response to the common current.

3. A method in accordance with claim 2, wherein each of the plurality of optical sources is configured to receive a constant current.

4. A method in accordance with claim 1, wherein the optical combiner is a non-reflective-type or transmissive type combiner.

5. A method in accordance with claim 1, wherein the optical combiner includes an arrayed waveguide grating.

6. A method, comprising the steps of:
providing a plurality of optical sources on a substrate, each of the plurality of optical sources supplying a corresponding one of a plurality of optical signals, each of the plurality of optical signals having a corresponding one of a plurality of wavelengths and a corresponding one of a plurality of power levels, a first one of the plurality of optical signals having a first one of the plurality of power levels that is greater than a first set of the plurality of power levels, and a second one of the plurality of optical signals has a second power level that is lower than a second set of the plurality of power levels, the first and second optical signals having first and second ones of the plurality of wavelengths, respectively; and
providing an optical combiner on the substrate, the optical combiner having a plurality of inputs, each of which being configured to receive a corresponding one of the plurality of optical signals, the optical combiner having an associated passband envelope that has a loss that varies substantially quadratically with wavelength,
wherein, over a range of wavelengths including the plurality of wavelengths, the passband envelope has a peak loss at a peak wavelength, such that the first one of the plurality of wavelengths is spectrally spaced closer to the peak wavelength than the second wavelength.

7. A method, comprising the steps of:
providing a plurality of optical sources on a substrate, such that a first one of the plurality of optical sources is configured to generate a first optical signal having a first wavelength, and a second one of the plurality of optical sources is configured to generate a second optical signal having a second wavelength different than the first wavelength, the first one of the plurality of optical sources supplying the first optical signal with a first power and the second one of the plurality of optical sources supplying the second optical signal with a second power level greater than the first power level; and
providing an optical combiner on the substrate, the optical combiner having first and second inputs configured to receive the first and second optical signals, respectively, the optical combiner having an associated passband envelope that has a transmission that varies as a function of wavelength, wherein the optical combiner has a first loss at the first wavelength and a second loss at the second wavelength, the first loss being less than the second loss, such that the first power of the first optical signal and the second rower of the second optical signal are substantially equal when the first and second optical signals are output from the optical combiner.

8. A method in accordance with claim 7, wherein each of the plurality of optical sources is configured to receive a common current, the first and second ones of the plurality of optical sources respectively generating the first and second optical signals in response to the common current.

9. A method in accordance with claim 8, wherein each of the plurality of optical sources is configured to receive a constant current.

10. A method in accordance with claim 7, wherein the optical combiner is a non-reflective-type or transmissive type combiner.

11. A method in accordance with claim 7, wherein the optical combiner includes an arrayed waveguide grating (AWG).

* * * * *